Figure 1:
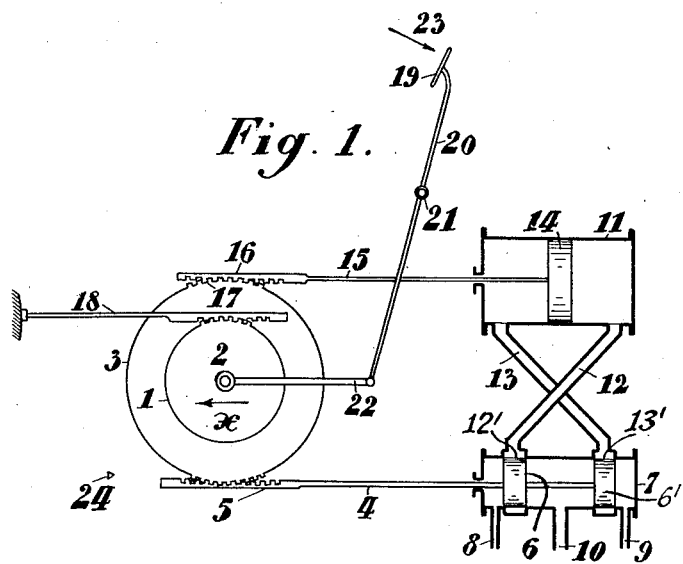

May 2, 1933.  P. BOLAND  1,906,222
CONTROL DEVICE FOR OPERATING MECHANISM
Original Filed Nov. 6, 1926  2 Sheets-Sheet 1

INVENTOR
P. BOLAND
BY
ATTY.

May 2, 1933. P. BOLAND 1,906,222
CONTROL DEVICE FOR OPERATING MECHANISM
Original Filed Nov. 6, 1926 2 Sheets-Sheet 2
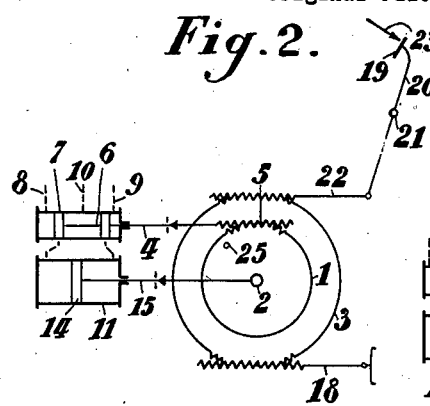
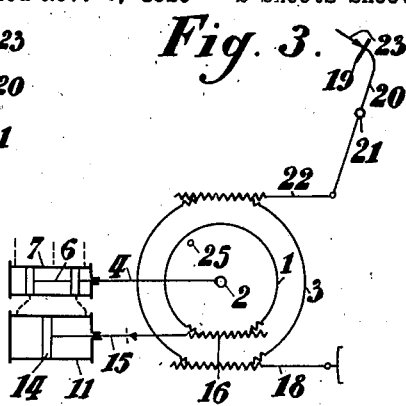
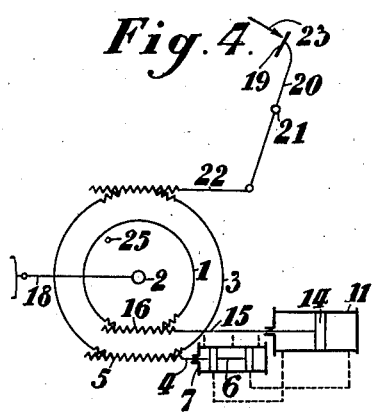
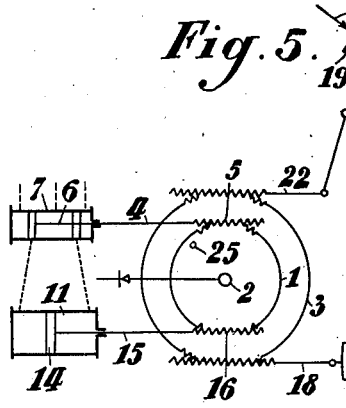
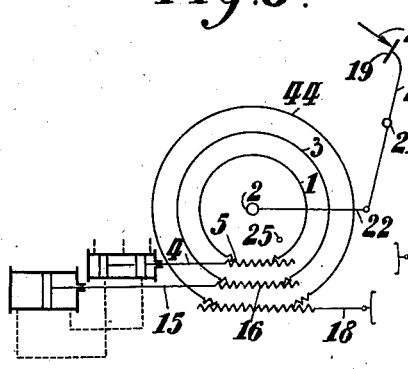
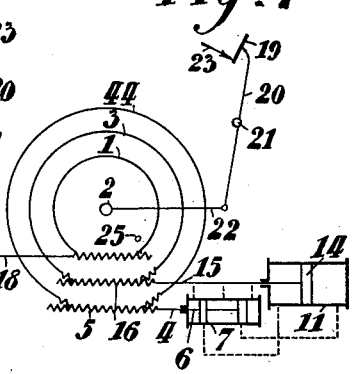
INVENTOR
P. BOLAND
BY Jno. Imirie
ATTY.

Patented May 2, 1933

1,906,222

UNITED STATES PATENT OFFICE

PAUL BOLAND, OF BRUSSELS, BELGIUM, ASSIGNOR TO SERVO-FREIN DEWANDRE SOCIETE ANONYME, OF LIEGE, BELGIUM, A COMPANY OF BELGIUM

CONTROL DEVICE FOR OPERATING MECHANISM

Application filed November 6, 1926, Serial No. 146,762, and in Belgium April 16, 1926. Renewed March 2, 1932.

I have filed applications for patent in the following country: Belgium; on April 16, 1926 and May 19, 1926.

The present invention is directed to an operating mechanism for the control of servo-motors designed more particularly for use in connection with vehicle brakes.

The primary object of the present invention is the provision of an operating mechanism which is continually under the control of the operator and through which the operator, during the complete operation, is sensible of a reaction as a function of the action to which the apparatus to be operated is subjected and is proportional to such effect to thereby enable the operator to be advised as to the functioning and power effect of the control.

In controls of this type as heretofore proposed, the control operation has been carried out through the manipulation of a series of interconnected levers or like parts having angular displacements in operation. Incident to such angular displacement and consequent variations in the angles between the members, a somewhat difficult problem has been presented in designing an apparatus, owing to the necessity of taking into consideration the variations in the angles between the connected levers during operation.

The present invention aims to entirely avoid the necessity for any such problem by providing that the different forces acting on the control mechanism of the invention maintain at all times the same direction of action, thus avoiding any angular change in the relation of the parts and thus overcoming the disadvantage noticeably incident to prior similar systems.

The invention contemplates the use of a servo-motor operated by a remotely generated source of energy, such as the suction of the engine of the vehicle or air under pressure, together with a valve for controlling the admission of such energy fluid to the motor, there being interposed between the valve and the manually operable element a plurality of wheels keyed to the same shaft, with the wheels designed to operate the valve and power application, such as the brakes, and to be operated by the servo-motor.

The invention is illustrated in the accompanying drawings, in which:—

Figure 1 is a diagrammatic representation of a servo-motor operated brake constructed in accordance with the present invention.

Figures 2 to 7 inclusive are diagrammatic representations of relatively modified constructions.

With particular reference to Figure 1, the improved control mechanism includes pinions 1 and 3, preferably of different diameters, keyed or otherwise fixed upon a shaft 2 mounted for bodily movement in a direction at right angles to its axis. The bodily movement of the shaft 2 is provided for through the operation of a manually operable element, here shown as a pedal 19, carried at one end of a foot lever 20 pivotally supported intermediate its ends at 21 and connected at the end remote from the pedal by a link 22 to the shaft 2, whereby the latter is bodily translated under pressure on the pedal in the direction of the arrow 23.

The periphery of the wheel 3, or so much of such periphery as may be necessary, is provided with gear teeth which at diametrically opposite points on the wheel are in cooperation with racks 5 and 16. The rack 5 is formed on or carried by a valve rod 4 which extends into a valve casing 7 carrying slide valves 6 and 6'. The valves are so arranged on the valve rod that in one position they simultaneously close ports 12' and 13' opening from the valve casing 7 into conduits 12 and 13 leading to a servo-motor cylinder 11 in which is arranged a power piston 14, the piston rod 15 of which extends to and carries or is formed with the rack 16. The valve casing is formed with an inlet port 10 leading from the source of motive fluid under the form of energy being used, the port 10 entering the casing intermediate the slide valves 6 and 6', such casing being further formed with exhaust ports 8 and 9 beyond the respective valves 6 and 6'.

Obviously, by movement of the valve rod 4, the valves may be positioned to admit the power fluid to either side of the piston 14 of the servo-motor, while at the same time placing the other side of the motor cylinder in communication with an exhaust port. The wheel 2 has a peripheral series of teeth cooperating with the teeth 17 on a rack bar 18 which extends oppositely from the direction of the valve rod 4 and piston rod 15 and is terminally connected through suitable details, if necessary, to the brake or brake rigging.

When the lever 19 is moved in the direction of the arrow 23, the shaft 2 is moved bodily in a direction at right angles to its axis. As the piston rod 15, through the piston, is held relatively fixed, the bodily movement of the shaft 2 causes the wheel 3 to roll on the racks 16. This causes the piston rod 4 to be operated, moving the valves 6 and 6′ to admit fluid under pressure from port 10, exhaust port 9 being covered by valve 6′. With suction as the source of energy ports 8 and 9 may be connected to any suitable source of suction such as the intake manifold of the automobile engine. With actuation of valve rod 4 as heretofore described, port 9 is uncovered evacuating the left side of the servo-motor through conduit 13, the right side of the servo-motor being vented to atmosphere through port 10. The servo-motor piston then moves as a result of this power, and as the shaft 2 is now fixed against bodily movement, the toothed wheel 3 will move under the movement of the piston rod 15 and the wheel 1, being fixed relative to the wheel 3, turns with it to operate the rod 18 and so affect the brakes. Incident to this movement of the wheel 3, the valve rod 4, is obviously operated in a direction opposite to that first noted, with the effect to restore the valves 6 and 6′ to the neutral position and cut off further movement of the piston 14.

For a given position of the wheels, the reaction on the shaft 2 resulting from the forces exerted by the brake rigging and by the servo-motor piston depends only on the radii of the said wheels. For such a position, the ratio between the force applied to the brake rigging and the force applied to the wheel shaft is constant and depends only on the dimensions given the wheels.

In order that the device may still operate the brake in case of failure of the motive power, it is provided with a fixed stop, shown diagrammatically at 24, and against which the rack 5 abuts if the pedal 19 is pushed sufficiently far. As soon as this occurs, the wheel 3 will roll on the said rack, acting on the rod 18 in the same direction as if the motive power had acted.

In order to release the brake, the pressure is removed from the pedal 19. The servo-motor piston 14 being held immovable, the wheel 1 rolls to the right on the rack 16, incident to the usual brake-return or release springs (not shown). The rod 4 and the valve pistons 6 are carried along in the same direction until the said piston occupies a position at the right of that shown. At this moment, there is a displacement of the piston 14 toward the right on account of the admission being opened on its left and the exhaust being opened on its right. This movement which releases the brake, causes the pinions 1 and 3 to rotate about the shaft 2 in a clockwise direction. This rotation continues until the valve piston is brought back to the position shown in the drawing.

In the case shown in Figure 2, the control pedal is not connected to the shaft 2 on which the wheels are mounted, but to one of the wheels. Here the servo-motor piston rod 15 is connected to the shaft 2. In the arrangement shown in Figure 3, the valve piston 6 is connected to the shaft 2 by the piston rod 4. Figure 4 shows a form of construction in which the shaft 2 is connected to the rod 18 forming part of the brake rigging.

As another alternative, Figure 5 shows an arrangement in which no wheel is rigidly connected to the shaft 2, the latter being bodily movable as in other forms. Finally, Figures 6 and 7 relate to forms of construction in which three wheels have been used for connecting the various members of the apparatus together. The additional wheel introduced is designated by the reference number 44.

Whatever be the form of construction represented, the various points of connection occupy relative positions such that the operator feels a sensation of resistance proportional to the force exerted on the brake shoe.

The apparatus such as described applies to servo-motor operated brakes, but it is evident that the control device utilized therein can be employed for operating mechanisms other than that for brakes. Whatever be the use to which the device is put, the different points of the members connected to the wheels can be interchanged with each other. It is also evident that the invention is not limited exclusively to the mechanisms such as described, the said mechanisms only being given as examples and not as limitations.

What I claim is:

1. In a control apparatus for brake mechanisms, an auxiliary motor, brake mechanism operated thereby, a distributor controlling said motor, a shaft movable by translation perpendicularly to its axis, toothed wheels keyed on said shaft, an element adapted to be actuated by the operator to set one of the toothed wheels in rotation, means to connect the motor, the distributor, and the brake mechanism to the system formed by said shaft and said wheels, so that the movements of the brake mechanism are subject to those of the element manipulated by the operator and that the effort exerted by the drive on the brake mechanism produces a proportional reaction on the element actuated by the operator, stop means provided to limit the movements of the mechanism formed by the shaft and wheels for the purpose of permitting the direct action of the element manipulated by the operator on the brake mechanism in case of failure of the motor.

2. In a control apparatus, brake mechanism, an auxiliary motor therefor, a distributor controlling said motor, a shaft movable by translation perpendicularly to its axis, gear wheels keyed on said shaft, a pedal to be actuated by the operator and connected with said shaft, rods, one end of each of which is formed as a rack to engage respectively with said wheels, said rods being connected respectively to the motor, the distributor and the brake mechanism, the rods of the motor and distributor meshing with one wheel, the rod of the brake mechanism meshing with the other wheel, stop means being provided to limit the movements of the mechanism formed by the shaft and wheels to permit the pedal to act directly on the brake mechanism in case of failure of the motor.

3. In a control apparatus for brake mechanisms, an auxiliary motor, a brake mechanism operated thereby, a distributor controlling the motor, an element to be actuated by the operator, gearing mounted for rotary and translational movement, said gearing being bodily responsive to physical actuation of said element and acting through one or the other of its permissible movements to operate the distributor to control the auxiliary motor, with said gearing further responsive to motor operation for compelling one of the permissible movements of the gearing for actuating the brake mechanism, the gearing providing for direct actuation of the brake mechanism through operation of the element in the event of failure of the auxiliary motor.

4. In a control apparatus for brake mechanisms, an auxiliary motor, a brake mechanism operated thereby, a distributor controlling the motor, an element to be actuated by the operator, and gearing mounted for rotary and translational movement, said gearing being bodily responsive to physical actuation of said element and acting through one or the other of its permissible movements to operate the distributor to control the auxiliary motor, with said gearing further responsive to motor operation for compelling one of the permissible movements of the gearing for actuating the brake mechanism, the gearing insuring a reaction on the element proportional and incidental to the movement of the gearing necessary to operate the brake mechanism.

5. In a control apparatus, brake mechanisms, an auxiliary motor therefor, a distributor controlling said motor, a shaft movable by translation perpendicularly to its axis, gear wheels keyed on said shaft, a pedal to be actuated by the operator and connected with said shaft, rods, one end of each of which is formed as a rack to engage respectively with said wheels, said rods being connected respectively to the motor, the distributor and the brake mechanism, the rods of the motor and distributor meshing with one wheel, the rod of the brake mechanism meshing with the other wheel, stop means being provided to limit the movements of the mechanism formed by the shaft and wheels to permit the pedal to act directly on the brake mechanism in case of failure of the motor.

6. Apparatus including a pressure fluid responsive auxiliary motor, a distributor controlling the action of said fluid on said motor, a shaft movable by translation perpendicularly to its axis, two gear wheels keyed on the same shaft, a pedal adapted to be actuated by the operator and connected to the first wheel by a rack rod, a rack rod for power development being connected to the first wheel, a rod connecting the motor to the shaft, said motor being formed by a piston moving in a cylinder and on which action is exerted by the fluid under the control of the distributor, said distributor being connected by a rack rod to the second wheel, stop means being provided on one of the wheels and on the paths traversed by the rods connecting the distributor and the motor, to limit the movements of the system formed by the shaft and wheels in order to permit the pedal to act directly on the receiver in case of failure of the motor fluid.

7. Apparatus including a pressure fluid responsive auxiliary motor, a distributor controlling the action of said fluid on said motor, a shaft movable by translation perpendicularly to its axis, two gear wheels keyed on said shaft, a pedal adapted to be actuated by the operator and connected to a first gear wheel by a rack rod, a rack rod for power development being connected to the first wheel, a rod connecting the distributor to the shaft, a rack rod engaging with the second wheel and connecting said wheel to the motor, stop means being provided to limit the movements of the system formed by the shaft and wheels in order to permit the pedal to act directly on the receiver in case of failure of the motor fluid.

In witness whereof I affix my signature.

PAUL BOLAND.